(12) United States Patent
Philippe

(10) Patent No.: US 8,550,442 B2
(45) Date of Patent: Oct. 8, 2013

(54) WORKPIECE HOLDING DEVICE, SYSTEM AND METHOD

(75) Inventor: Gilles Philippe, Steenokkerzeel (BE)

(73) Assignee: Asco Industries, Zaventem (BE)

( * ) Notice: Subject to any disclaimer, the term of this patent is extended or adjusted under 35 U.S.C. 154(b) by 647 days.

(21) Appl. No.: 12/669,352

(22) PCT Filed: Jul. 18, 2008

(86) PCT No.: PCT/EP2008/059470
§ 371 (c)(1),
(2), (4) Date: May 13, 2010

(87) PCT Pub. No.: WO2009/010586
PCT Pub. Date: Jan. 22, 2009

(65) Prior Publication Data
US 2010/0252978 A1    Oct. 7, 2010

(30) Foreign Application Priority Data

Jul. 19, 2007 (EP) .................................. 07112801

(51) Int. Cl.
*B25B 1/20* (2006.01)
*B25B 1/22* (2006.01)
*B25B 1/24* (2006.01)
*B23Q 3/00* (2006.01)

(52) U.S. Cl.
USPC .............. 269/296; 269/75; 269/71; 269/43; 269/45; 269/271

(58) Field of Classification Search
USPC ......... 269/75, 71, 43, 45, 271, 305, 143, 130
See application file for complete search history.

(56) References Cited

U.S. PATENT DOCUMENTS

| 5,224,692 | A  | * | 7/1993  | Anderson et al. ............... 269/75 |
| 5,305,992 | A  | * | 4/1994  | Kish ............................... 269/51 |
| 5,466,078 | A  |   | 11/1995 | Szmanda et al. |
| 6,305,447 | B1 | * | 10/2001 | Rousseau ................... 144/135.2 |
| 2007/0138358 | A1 | * | 6/2007 | Chang ......................... 248/205.5 |

FOREIGN PATENT DOCUMENTS

| EP | 461994  | 12/1991 |
| GB | 1014809 | 12/1965 |

OTHER PUBLICATIONS

International Search Report and Written Opinion in PCT/EP2008/059470 dated Oct. 31, 2008.

* cited by examiner

*Primary Examiner* — Lee D Wilson
*Assistant Examiner* — Seahee Yoon
(74) *Attorney, Agent, or Firm* — McCracken & Frank LLC

(57) ABSTRACT

The present invention relates to a workpiece holding device (101, 201) comprising a substantially spherical ball (107, 207) with means for releasably retaining a workpiece (901), a socket (102, 202) with a first ball-receiving surface (105, 205) and means for mounting said socket (102, 202) on a worktable (905), and means for releasably clamping said ball (107, 207) against said first ball-receiving surface (105, 205). The first ball-receiving surface (105, 205) is shaped on a ball-receiving element (104, 204) mounted moveable, within said socket (102, 202), along at least one axis in a plane substantially perpendicular to its clamping force. The invention also relates to a workpiece holding system comprising three workpiece holding devices (101, 201, 301), as well as to a method for using this workpiece holding system.

12 Claims, 10 Drawing Sheets

WORKPIECE HOLDING DEVICE, SYSTEM AND METHOD

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC

Not applicable.

SEQUENCE LISTING

Not applicable.

BACKGROUND OF THE INVENTION (1) Field of the Invention

The present invention relates to a workpiece holding device, system and method.

(2) Description of Related Art Including Information Disclosed Under 37 CFR 1.97 and 1.98.

For processing, and particularly for machining workpieces, it is generally necessary to hold the workpiece in a fixed position and orientation. Generally, the workpiece is held using one or several devices such as clamps or vices, so as to prevent such movement of the workpiece during a processing step that could disturb the final shape or appearance of the workpiece after the process.

A particularly flexible type of workpiece holding device is represented by ball-and-socket workpiece holding devices, such as have been disclosed, for instance, in British patent GB 1,014,809 or European patent application EP 0 461 994 A1. Such workpiece holding devices of the state of the art comprise a substantially spherical ball with means for releasably retaining a workpiece, a socket with a first ball-receiving surface and means for mounting said socket on a worktable, and means for releasably clamping said ball against said first ball-receiving surface, so as to block rotational movement of said ball within said socket.

Before clamping the ball against the ball-receiving surface of the socket, the ball can rotate at least to a certain extent within the socket, thus allowing a user to orient the connecting means and the workpiece connected to it, so as to facilitate the work on said workpiece.

However, while they may provide three rotational degrees of freedom, the ball-and-socket workpiece holding devices of the state of the art do not provide any means for translationally adjusting the position of the ball, to adapt it, for instance, to workpieces with attachment points whose position may vary within certain manufacturing tolerances. While it has been proposed, for instance in EP 0 507 033 A1, to make the sockets themselves translationally moveable, the need for maintaining the position of the socket stable while the workpiece is processed results in mechanically complicated socket translation and locking devices.

While a ball-and-socket keyboard holding apparatus was proposed in U.S. Pat. No. 5,466,078 in which a ball-receiving element is mounted moveable within the socket along one axis in a plane perpendicular to the ball clamping force, the clamping means in this prior art is not suitable for reliably blocking the rotational movement of the ball within the socket against strong stresses, as generated, for instance, while machining a workpiece, and the apparatus has a separate lock tab for locking the ball-receiving element with respect to the socket. A first objective of the present invention is thus that of allowing at least limited translational adjustments to the position of the ball, while blocking such adjustments, at the same time as the rotational adjustments, by clamping the ball.

BRIEF SUMMARY OF THE INVENTION

In order to achieve this objective, in the workpiece holding device of the invention said first ball-receiving surface is shaped on a ball-receiving element mounted so as to be moveable, within said socket, along at least one axis in a plane substantially perpendicular to its ball clamping force when said clamping means are released, but lockable in place by closing said clamping means. This will allow limited translational adjustments to the position of said ball-receiving element and, with it, of the ball and its connecting means to the workpiece, while allowing a reliable lock of said translational position when the ball is clamped, as the ball-receiving element will be clamped under it.

Preferably, said first ball-receiving surface is substantially conical. Such a shape has the advantage of providing a stable seat for the ball, while being comparatively simple to produce. Alternatively, however, said first ball-receiving surface could also be, for instance, a substantially spherical surface with an equal or larger radius than the ball.

Preferably, said ball clamping means comprises an internal member and an external member, the external member comprising means for transmitting said ball clamping force to said socket and the internal member comprising a second ball-receiving surface for contacting said ball and clamping said ball between said first and second ball-receiving surfaces. By having these separate internal and external means, it is easier to maintain an alignment of the first and second ball-receiving surfaces, even when the ball receiving element in the socket is laterally adjusted. The second ball-receiving surface is also preferably conical, although other shapes, such as, for instance, a substantially spherical shape of equal or larger radius than the ball, could also be contemplated alternatively.

Even more preferably, said external member comprises a screw thread, said socket comprises a screw thread, and said screw threads of the external member and socket can cooperate for connecting the external member and socket and generating said ball clamping force by tightening the connection between them. By screwing the external member onto the socket and tightening this screw connection, it is possible to apply and maintain a strong, stable and precise ball clamping force between said external member and socket that, clamping said internal member, ball and ball-receiving member between them, will hold the position and orientation of the ball even under considerable loads.

Since falling debris, should they come between parts of the workpiece holding device, such as, for instance, the ball and the first or second ball receiving surfaces, or the screw threads of said external member and socket, could damage them, the workpiece holding device of the invention preferably comprises a cover element for protecting the holding device from falling debris, such as, for instance, metal shavings.

In some instances, such as for instance in workpiece holding systems comprising more than one single workpiece holding device, it may be preferable or even necessary to allow translational adjustments to the ball position in a workpiece holding device only along a single axis. To achieve this, the socket may further comprise means for guiding the movement of said ball receiving element within said socket along a single axis substantially perpendicular to its ball clamping force.

It may then be preferable if the socket further comprises means for externally indicating the direction of said single axis, so that a user can know when the socket is mounted in the adequate orientation on the worktable. In a particularly advantageous embodiment, said means for mounting the socket on a worktable comprise a plurality of bolts, such as, for instance, four, arranged around the socket and at least one of these bolts is differently shaped and/or sized to indicate the direction of said single axis.

In many cases, to ensure the stability of a workpiece while it is being processed, it is necessary to hold the workpiece simultaneously with a plurality of workpiece holding devices connected to different attachment points on the workpiece. However, because of manufacturing tolerances, the relative positions of these attachment points may vary within those tolerances. Without means for adjusting the relative positions of these workpiece holding devices, holding the workpiece will thus generate significant internal stresses in the workpiece. When the workpiece is released after processing, these internal stresses may cause deformations, resulting in poorer manufacturing tolerances, and eventual reprocessing or even rejection of the processed workpiece at great expense.

A further objective of the present invention is therefore that of isostatically holding a workpiece with at least three attachment points without significantly stressing it even when the relative positions of the attachment points vary within certain manufacturing tolerances.

To achieve this objective, the present invention also relates to a workpiece holding system comprising a first and a second of the hereabove described workpiece holding devices, and a third workpiece holding device comprising a substantially spherical ball with means for releasably connecting said substantially spherical ball to a workpiece, a socket with a first ball-receiving surface and means for mounting said socket on a worktable, and means for releasably clamping the ball against said first ball-receiving surface, wherein said first ball-receiving surface is fixed in a plane perpendicular to its ball clamping force. The ball receiving element of the first workpiece holding device is mounted moveable, within its socket, in all directions in a plane substantially perpendicular to the direction of its ball clamping force, whereas the ball receiving element of the second workpiece holding device is mounted moveable, within its socket, along a single axis substantially perpendicular to the direction of its ball clamping force.

The present invention also relates to a method for using this workpiece holding system comprising the following steps:
   mounting the sockets of the first, second and third workpiece holding devices at predetermined positions on a worktable;
   connecting the balls of the first, second and third workpiece holding devices with their retaining means to different attachment points of a workpiece;
   placing the workpiece on the worktable in such a position that said balls come to rest against the first ball-receiving surfaces of the corresponding sockets; and
   clamping each ball against the corresponding first ball-receiving surface with the corresponding clamping means, so as to fix their position and orientation, and thus the position and orientation of the workpiece.

Because the first ball-receiving surfaces of the first and second workpiece holding devices can slide laterally within their sockets before the balls are clamped, their positions will adjust to varying relative positions of the attachment points, thus minimizing the internal stresses in the workpiece when the balls are clamped.

However, during processing, in particular machining of the workpiece, new internal stresses may build up in the workpiece between those attachment points. Another objective of the present invention is thus the alleviation of internal stresses between processing steps in the workpiece for achieving a processed workpiece with considerably tighter manufacturing tolerances at lower cost.

This objective can be achieved by unclamping the balls of the three workpiece holding devices after carrying out at least one first processing step on said workpiece so as to release any internal stresses in the workpiece caused by said at least one first processing step; and clamping the balls again after releasing said internal stresses, so as to fix again the position and orientation of the workpiece before carrying out at least one further processing step on said workpiece.

By using this workpiece holding system and method, it is possible to release the internal stresses of the workpiece between processing steps. As the balls of the three workpiece holding devices are then clamped again before further processing, the workpiece will then be held stably by all three workpiece holding devices during said further processing against all external forces.

Moreover, separately mounting the balls to the workpiece and the sockets to the worktable before placing the workpiece on the worktable allows a faster workflow. Since the balls of all the workpiece holding devices may be identical or interchangeable, it is possible to keep a stock of workpieces with the balls already attached so as to successively fix them onto the same three sockets on a worktable with minimal work.

BRIEF DESCRIPTION OF THE SEVERAL VIEWS OF THE DRAWINGS

Several embodiments of the invention will now be described illustratively, but not restrictively, with reference to the following Figures.

DETAILED DESCRIPTION OF THE INVENTION

Figure 1:
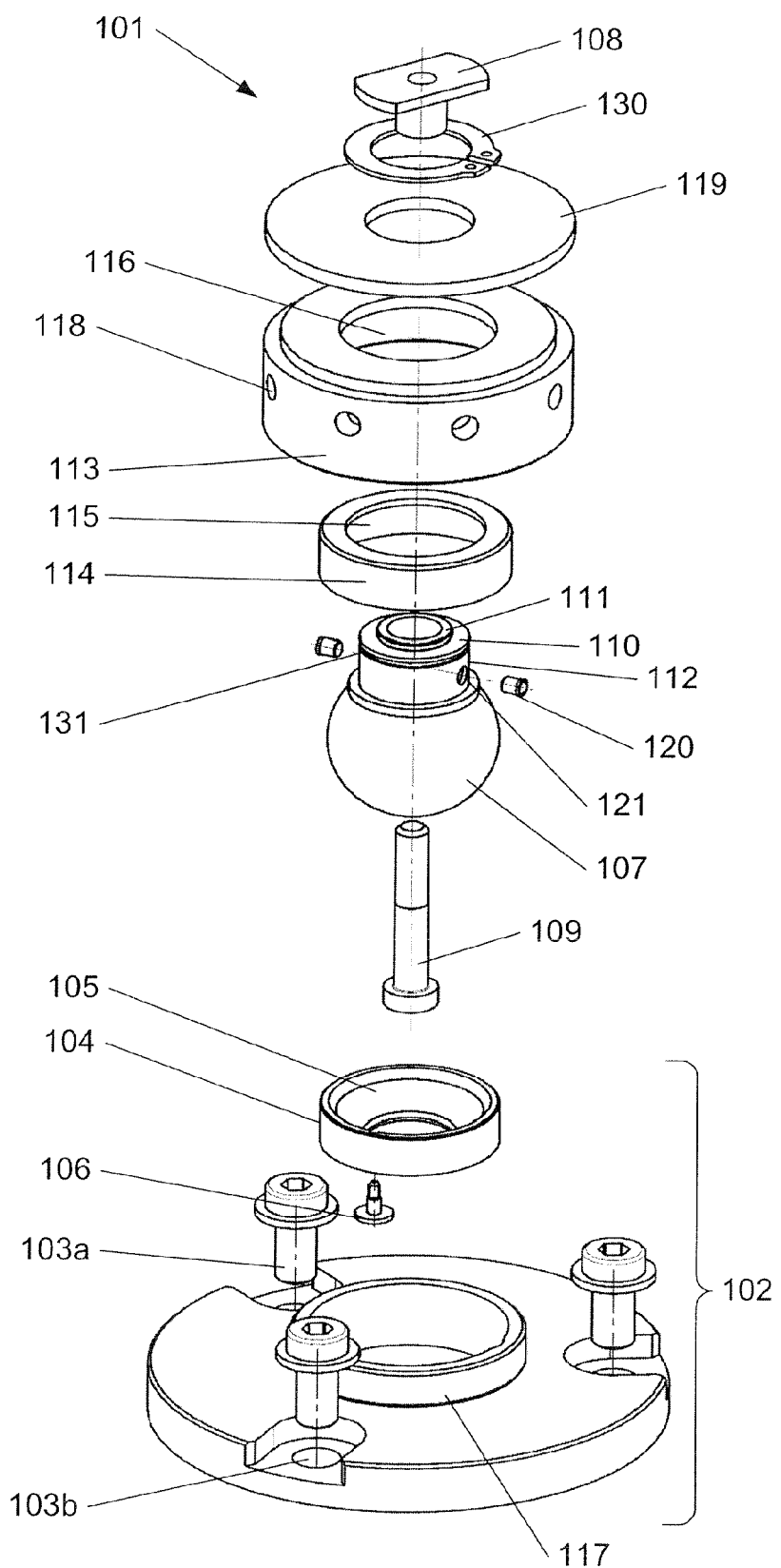
FIG. 1 shows an exploded perspective view of a first embodiment of a workpiece holding device according to the invention.

An exploded perspective view of a first embodiment of a workpiece holding device 101, showing all its individual components, is illustrated in FIG. 1. This workpiece holding device 101 comprises a socket 102 with bolts 103a in bolt-receiving orifices 103b for mounting it onto a worktable (not shown) and a ball-receiving element in the shape of a ring 104 with an inner conical first ball-receiving surface 105 and a retaining member 106.

The inner conical first ball-receiving surface 105 is shaped so as to accommodate a substantially spherical ball 107 with means for releasably retaining a workpiece. In the illustrated embodiment, these retaining means comprise a T-shaped member 108 attached to the ball 107 with a bolt 109, a top surface 110 of a cylindrical extension 112 of the ball 107 and a key protrusion 111 of said cylindrical extension 112 extending beyond said top surface 110. A suitably shaped attachment point on the workpiece can be retained or released by tightening or loosening the bolt 109 so as to close or open the space between the T-shaped member 108 and the top surface 110. However, alternative retaining means, such as, for example, clamps or vices, could be contemplated by the skilled person.

On top of the ball 107, but, in this illustrated embodiment, under the T-shaped member 108, are means for releasably clamping the ball 107 against the first ball-receiving surface 105 of the ring 104. In this embodiment, these clamping means comprise an external member 113 and an internal member 114. The internal member 114, similarly to the ring 104 is ring-shaped with an inner conical second ball-receiving surface 115, so that the ball 107 can be clamped between the first ball-receiving surface 105 and the second ball-receiving surface 115. The external member 113 comprises an internal screw thread 116 suitable for threading onto an external screw thread 117 on the socket 102. To clamp the ball 107 between the first ball-receiving surface 105 and the second ball-receiving surface 115, the threaded connection between external member 113 and socket 102 is tightened with a tightening torque resulting on a clamping force between said external member 113 and socket 102. The illustrated external member 113 comprises a series of radially arranged orifices 118 for receiving said tightening torque. Although in this illustrated embodiment screw threads and an external tightening torque are used to generate and maintain the clamping force with a simple and robust arrangement, a skilled person would, under appropriate circumstances, also contemplate alternative clamping means using, for example, hydraulic, or pneumatic clamps, comprising a pressurised fluid within at least one actuator, or electromagnetic clamps comprising a selectively activated electromagnet.

In the illustrated embodiment, the workpiece holding device 101 further comprises a cover element 119, retained by two spring-loaded balls 120 located in corresponding orifices 121 in the cylindrical extension 112. The purpose of this cover element 119 is to protect the elements below it from falling debris, such as metal shavings resulting from machining the workpiece. The spring-loaded balls 120 retain the cover element 119 close to the external member 113 in the clamped position, but a circlip 130 in a circular groove 131 around the cylindrical extension 112 ensures that the cover element 119 can not accidentally be removed from the workpiece holding device 101 in its unclamped position.

Figure 2:
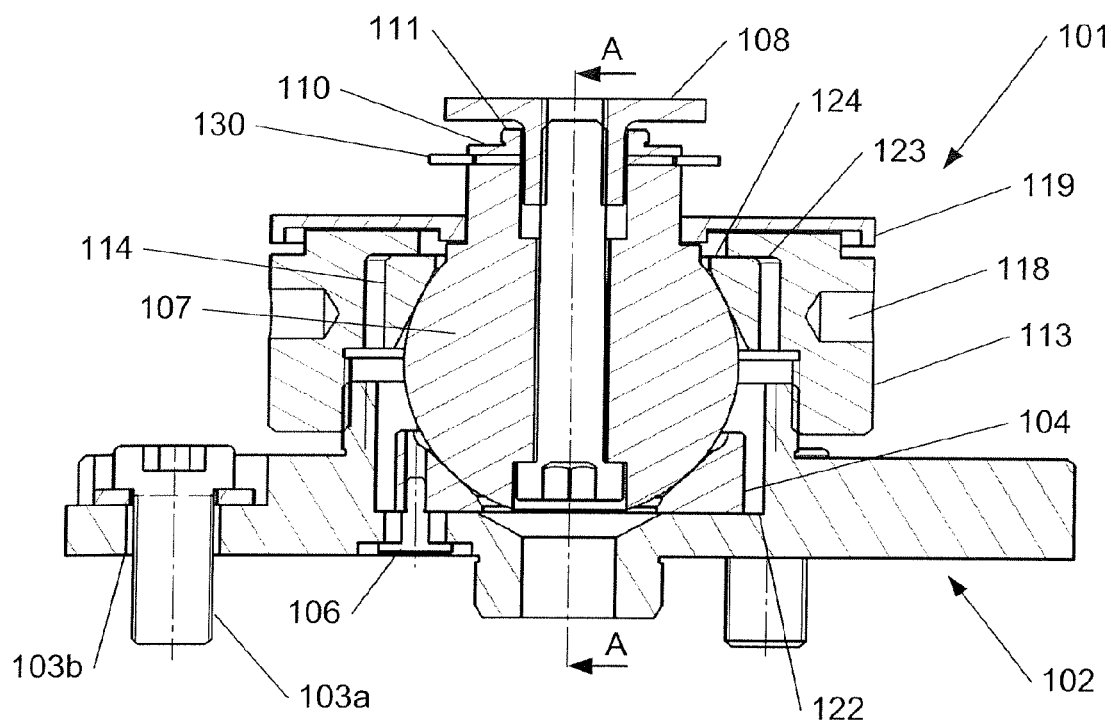
FIG. 2 shows a vertical cut view of the same workpiece holding device.
Figure 3:
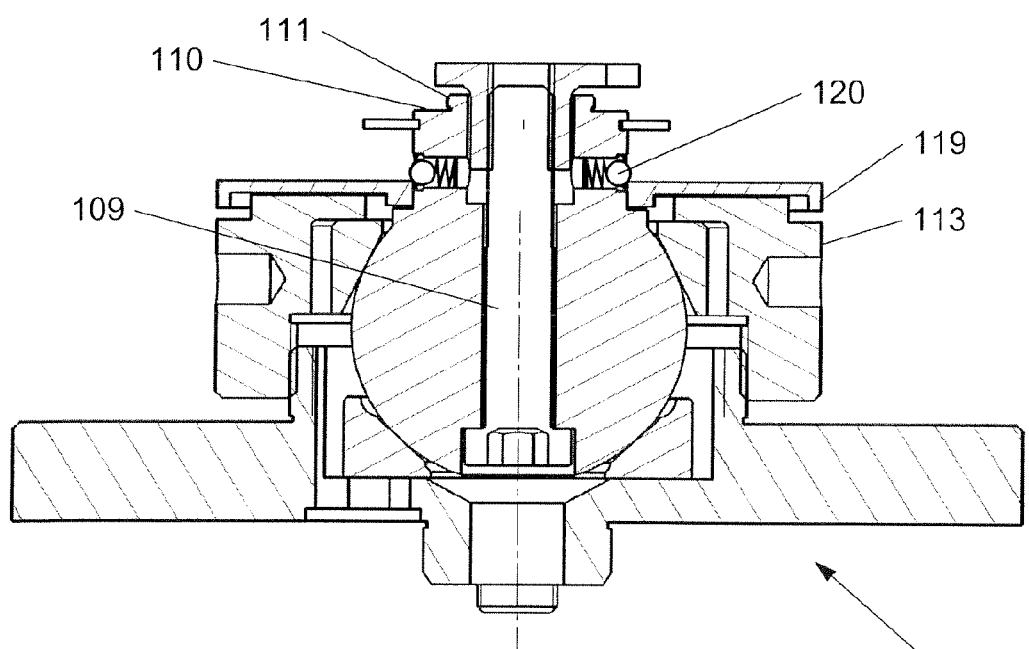
FIG. 3 shows a vertical cut view of the same workpiece holding device along line A-A of FIG. 2.

Turning now to FIGS. 2 and 3, the operation of the workpiece holding device 101 can be explained in more detail. As can be seen in both of these figures, the ring 104 is mounted moveable within the socket 102. Retaining member 106 prevents that the ring 104 be lifted in a vertical direction, but the ring 104 can slide on a surface 122 in all horizontal directions within the confines of the socket 102, adding two degrees of translational freedom to the three degrees of rotational freedom of the ball 107. However, when the external member 113 is tightened, the vertical clamping force acting from the external member 113 through the internal member 114 and onto the ball 107, not only clamps the ball 107 firmly between the internal member 114 and the ring 104, preventing rotation of the ball 107, but also clamps the ring 104 between the ball 107 and surface 122 of the socket 102, preventing lateral movement of ring 104 and thus of ball 107 within the socket 104.

Since the internal member 114 is also mounted moveable within the external member 113, it can realign itself with the ring 104 when it is laterally displaced, even if the external member 113 stays aligned with the socket 102. The clamping force is transmitted between the external member 113 and the internal member 114 through their correspondent surfaces 123 and 124.

Figure 4:
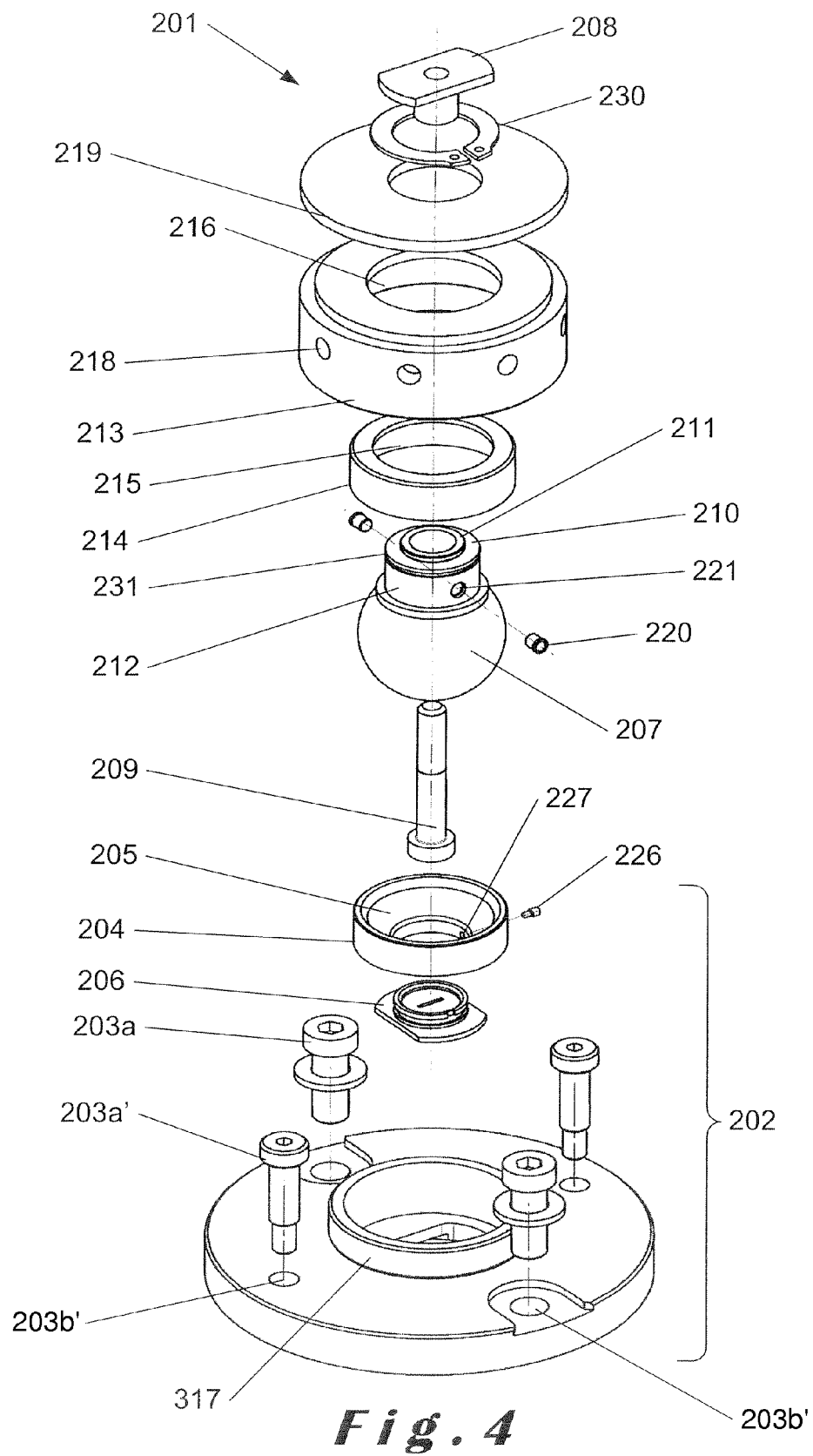
FIG. 4 shows an exploded perspective view of a second embodiment of a workpiece holding device according to the invention.
Figure 5:
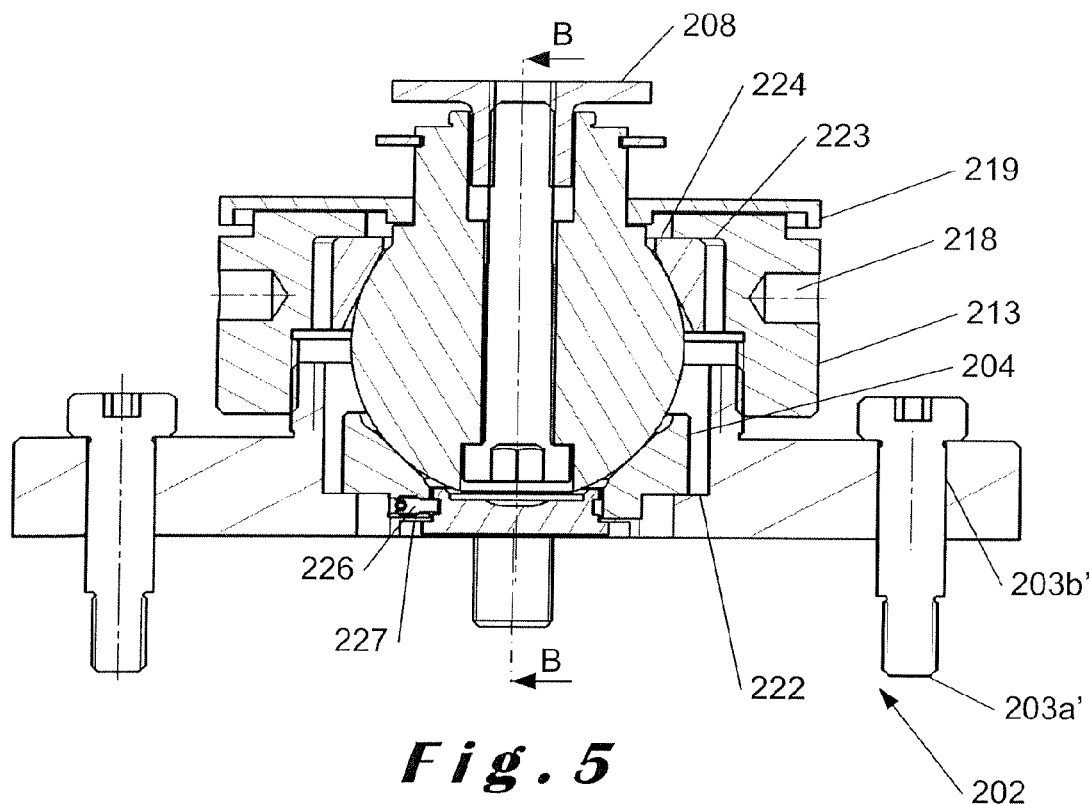
FIG. 5 shows a vertical cut view of the same workpiece holding device.
Figure 6:
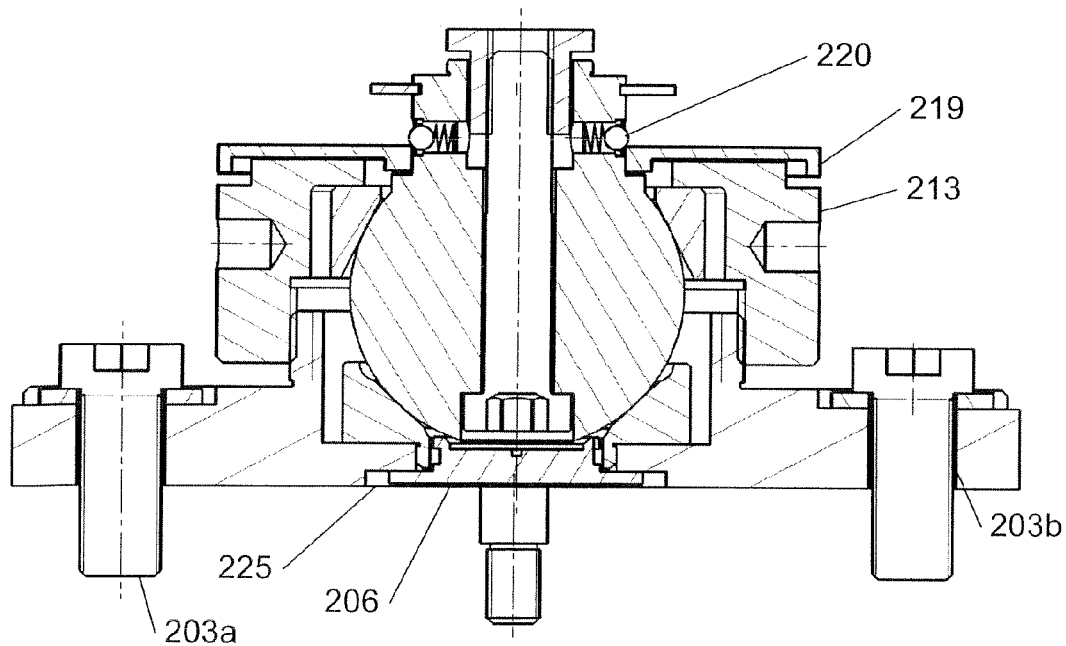
FIG. 6 shows a vertical cut view of the same workpiece holding device along line B-B of FIG. 5.

FIGS. 4 to 6 similarly present an alternative embodiment of the workpiece holding device of the invention. In this workpiece holding device 201, the ball 207, the clamping means and the cover element 219 are identical to those of the workpiece holding device 101 illustrated in FIGS. 1 to 3. The ball 207 also comprises identical means for releasably retaining a workpiece, in the shape of a T-shaped member 208 attached to the ball 207 with a bolt 209, a top surface 210 of a cylindrical extension 212 of the ball 207, and a key protrusion 211 of said cylindrical extension 212 extending beyond said top surface 210. The clamping means also comprise identical external and internal members 213, 214 with surfaces 215, 223 and 224, and the cover element 219 is also retained by two identical spring-loaded balls 220 located in corresponding orifices 221 in the cylindrical extension 212 and a circlip 230 in a circular groove 231. However, there are differences in the socket 202. In this socket 202, the ball-receiving element in the shape of a ring 204 is held down by a different retaining element 206 latched to an elongated guide 225 in the socket. This retaining element 206 not only prevents lift-off of the ring 204 from the surface 222 of the socket 202, but also guides its translational movement along a single horizontal axis. The ball 207 in this workpiece holding device 201 will thus have a single degree of translational freedom in addition to its three degrees of rotational freedom. In the illustrated embodiment, the retaining element 206 is connected to the ring 204 by a small screw 226 screwed into a small threaded orifice 227 of the ring 204 so as to reach into a circular groove 228 in the retaining element 206 so as to retain it axially while allowing rotational freedom around the vertical axis. However, other alternative arrangements should be obvious to the skilled person.

When using workpiece holding device 201, it is important that the user mounting the socket 202 on a worktable can externally recognise the direction of the axis of translational freedom. This could be solved by external marks on the socket 202. However, it is even more advantageous if the socket 202 can only be mounted in the intended orientation, so as to prevent human error. For this purpose, the socket 202 has two different sets of bolts 203a and 203a' in corresponding bolt-receiving orifices 203b, and 203b' for mounting it onto a worktable (not shown). The two orifices 203b are aligned in the direction of the axis of translational freedom of the ring 204 with the inner conical first ball-receiving surface 205. As the two pairs of bolts 203a, 203a' have different bolt diameters and/or screw threads and each one of the two pairs of orifices 203b, 203b' is adapted to a single one of those two types of bolts 203a, 203a', it will be possible to ensure that the socket 202 can only be mounted onto a worktable with a predetermined orientation.

Figure 7:
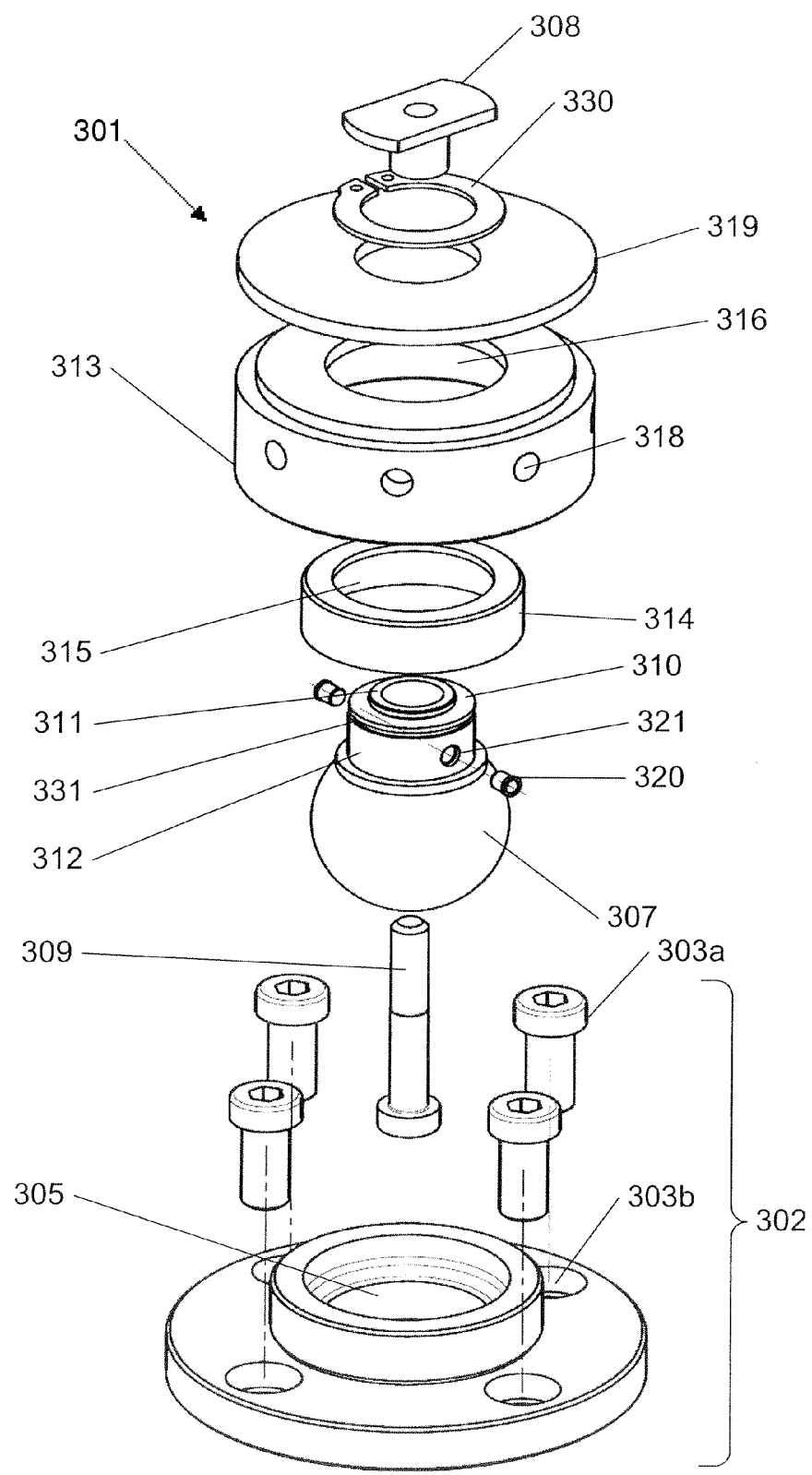
FIG. 7 shows an exploded perspective view of the third workpiece holding device of a workpiece holding system according to the invention.
Figure 8:
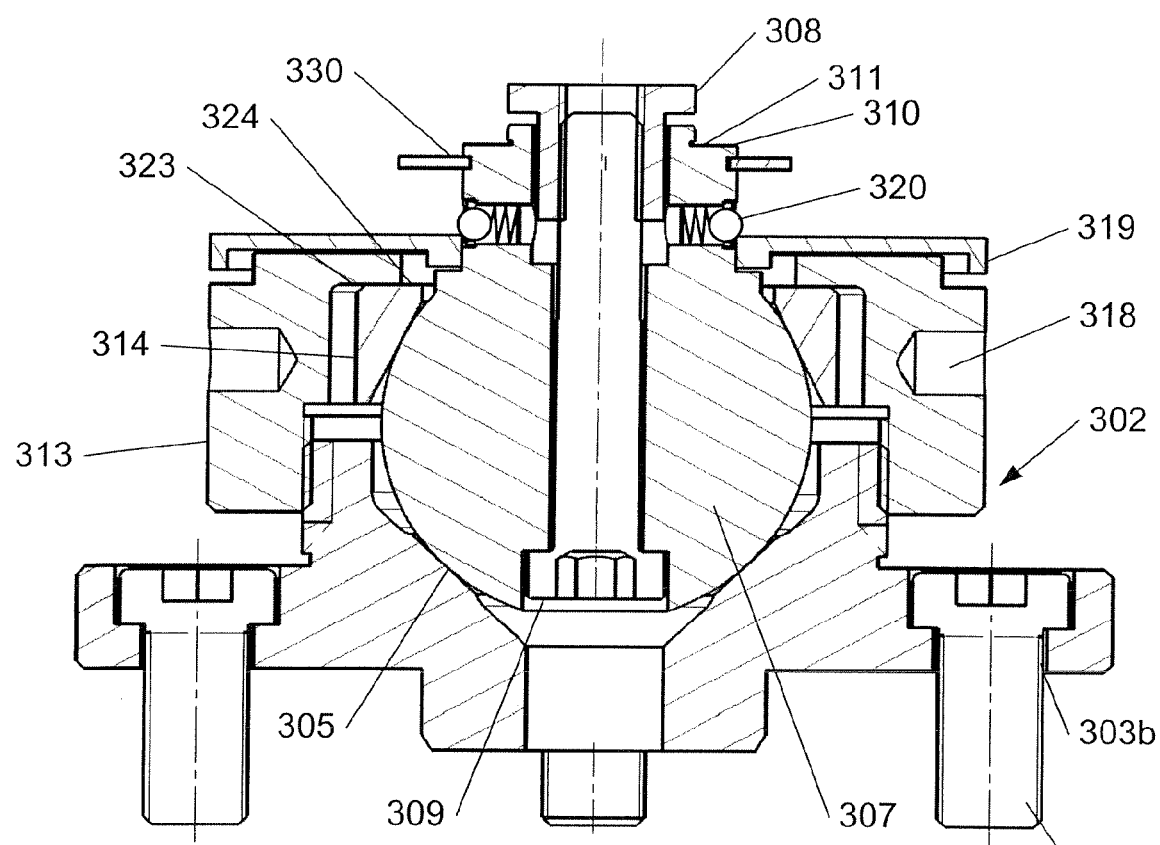
FIG. 8 shows a vertical cut view of the same workpiece holding device.
Figure 9:
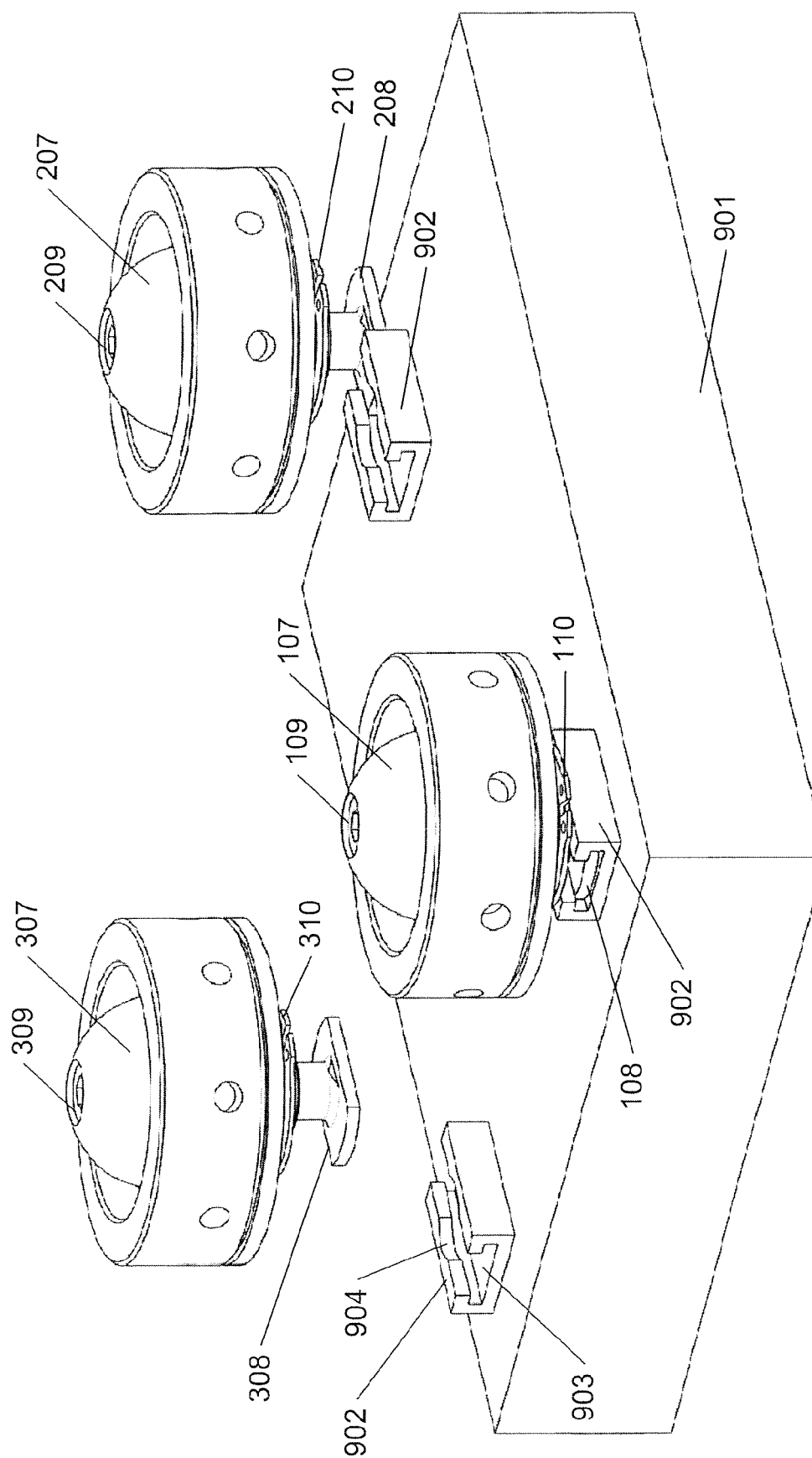
FIGS. 9 to 12 show various steps of the process of mounting a workpiece on a worktable using a workpiece holding system according to the invention.

The invention also relates to a workpiece holding system comprising several workpiece holding devices. In a particular embodiment, the workpiece holding system may comprise a first workpiece holding device 101 like the one illustrated in FIGS. 1 to 3, a second workpiece holding device 201 like the one illustrated in FIGS. 4 to 6 and a third workpiece holding device 301, which is illustrated in FIGS. 7 and 8.

This third workpiece holding device 301 is intended to provide a fixed reference point for the position of the workpiece, and is thus similar to workpiece holding devices of the state of the art. Therefore, in this workpiece holding device 301, the inner conical first ball-receiving surface 305 is fixed within the socket 302. However, the ball 307, the clamping means and the cover element 319 are also identical to those of the workpiece holding device 101 illustrated in FIGS. 1 to 3. The ball 307 also comprises identical means for releasably retaining a workpiece, in the shape of a T-shaped member 308 attached to the ball 307 with a bolt 309, a top surface 310 of a cylindrical extension 312 of the ball 307, and a key protrusion 311 of said cylindrical extension 312 extending beyond said top surface 310. The clamping means also comprise identical external and internal members 313, 314 with surfaces 315, 323 and 324, and the cover element 319 is also retained by two identical spring-loaded balls 320 located in corresponding orifices 321 in the cylindrical extension 312 and a circlip 330 in a circular groove 331. The socket 302 has bolts 303a in corresponding orifices 303b for mounting it onto a worktable.

Figure 10:
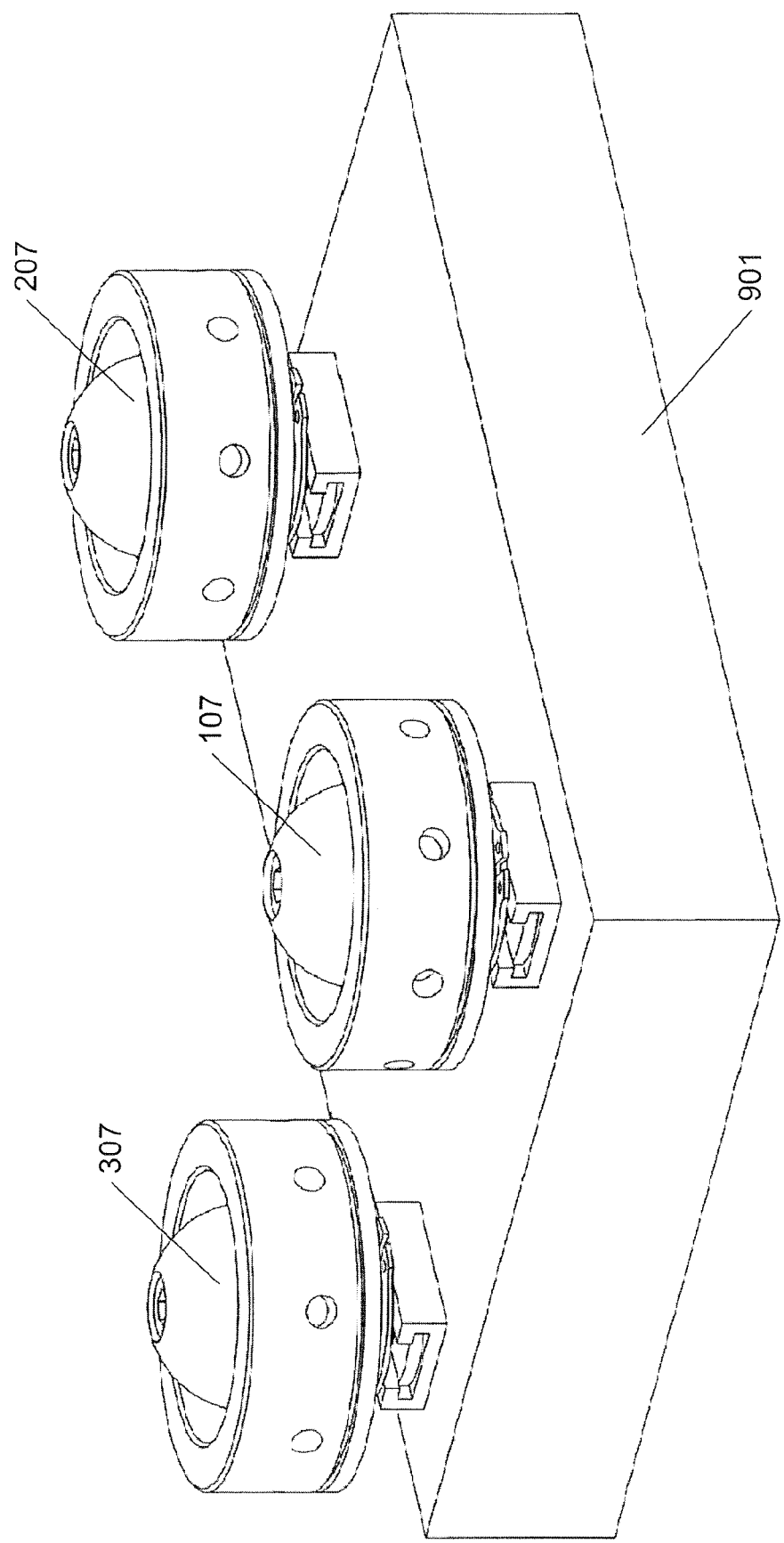
Figure 11:
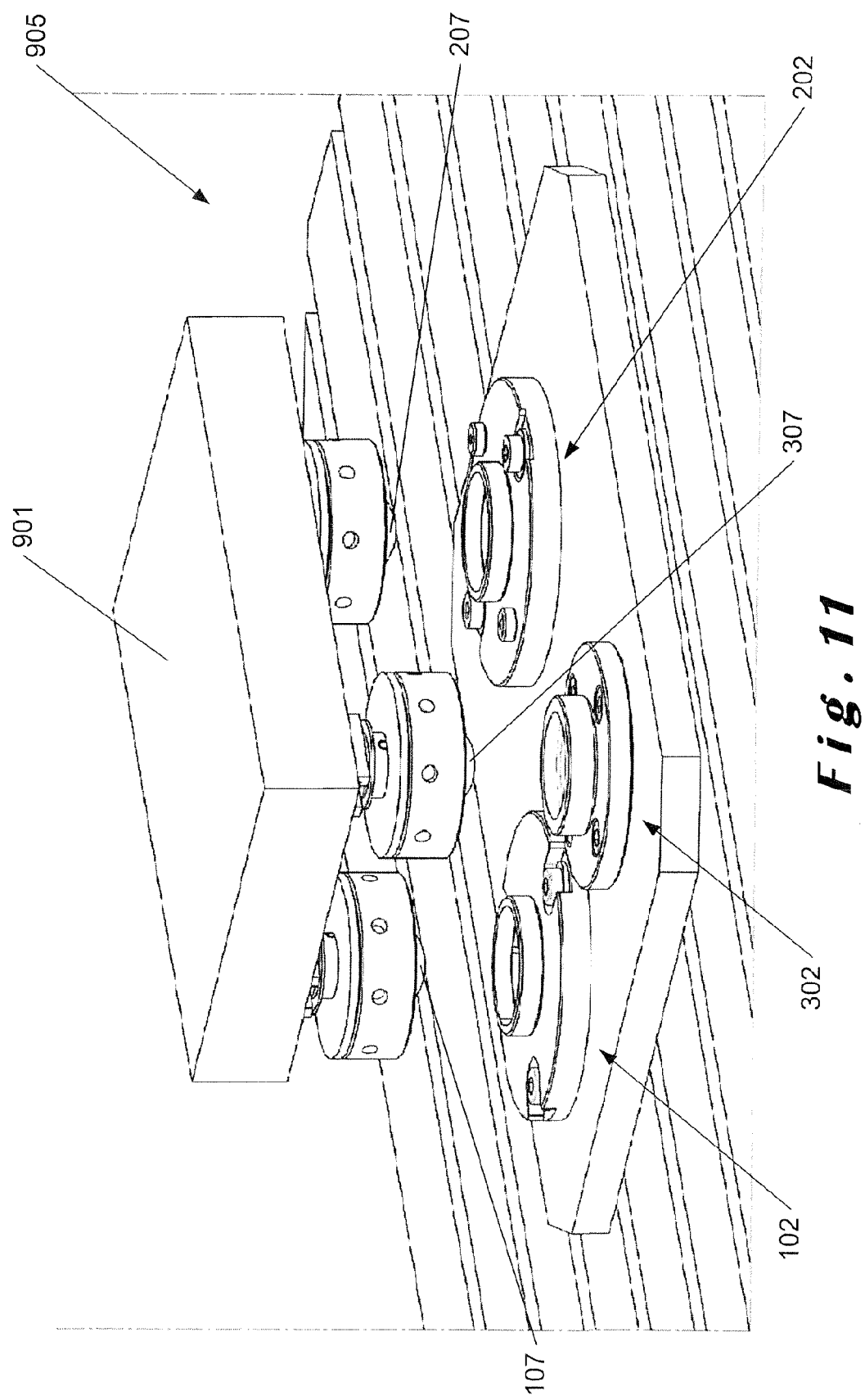

FIGS. 9 to 12 show several steps of a method for using this workpiece holding system. In FIG. 10, the balls 107, 207 and 307, together with their respective clamping means, are being attached to the workpiece 901 using their workpiece retaining means. Ball 307 is still away from the corresponding attachment point 902. Its bolt 309 is loose, so that the T-shaped member 308 hangs well apart from the retaining ring 310. The T-shaped member 208 of ball 207 is being introduced, in the same open state, into the channel 903 of its attachment point 902. The T-shaped member 108 of ball 107 has already been introduced into the channel 903 of its attachment point 902 and its bolt 109 tightened, so that ball 107 is attached to the workpiece 901. In FIG. 11 all three balls 107, 207 and 307 are attached to the workpiece 901 in this way. It must be noted that the curved surfaces 904 of each attachment point 902 (shown in FIG. 9) cooperate in this closed position with the key protrusions 111, 211, 311 of the balls 107, 207 and 307 to ensure that the balls 107, 207 and 307 are not only fixed vertically with respect to the workpiece, but also horizontally. Since the balls 107, 207 and 307, as well as their respective clamping means, are substantially identical, they are also completely interchangeable.

Figure 12:
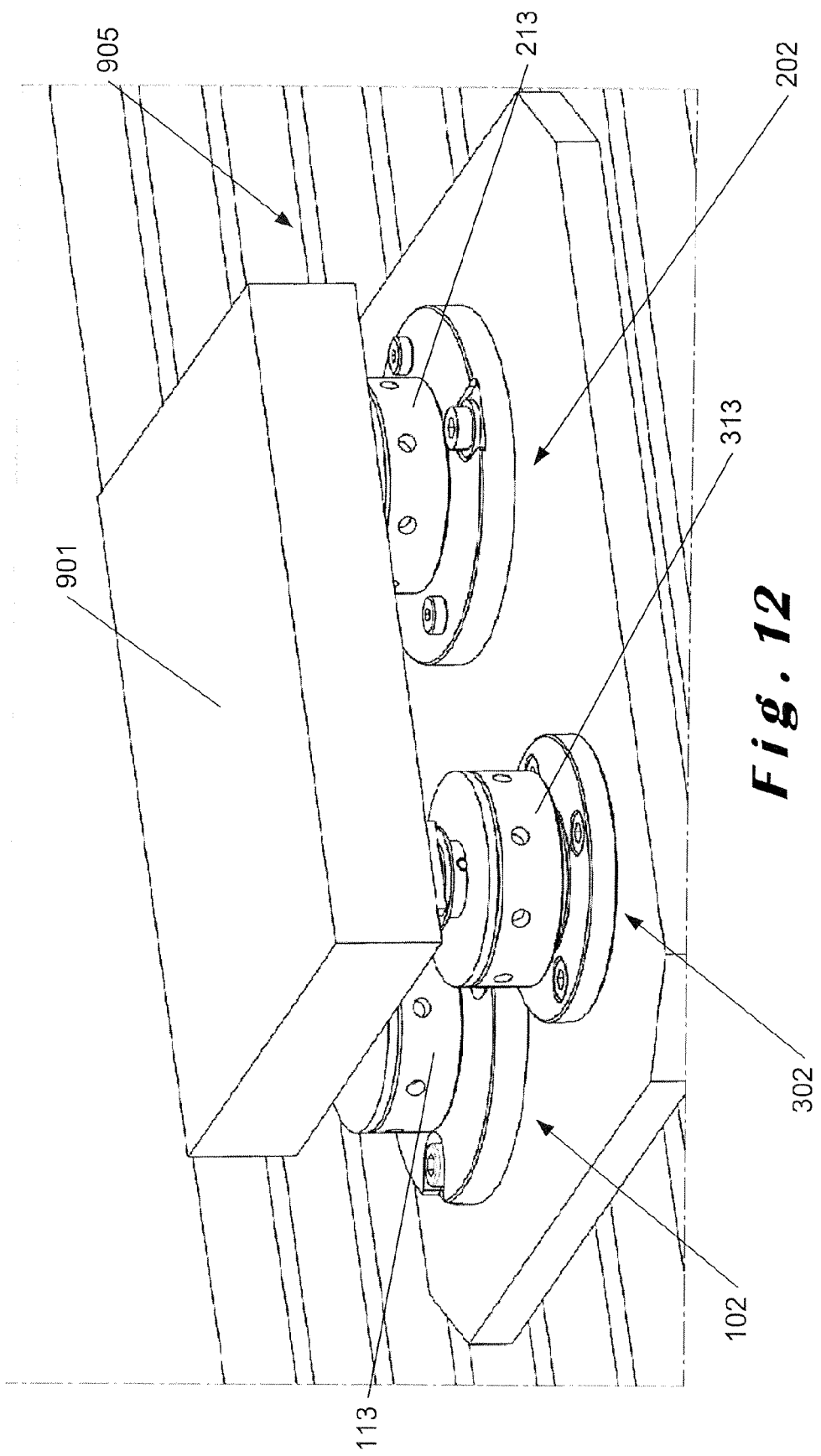

FIG. 11 shows the workpiece 901, with the balls 107, 207 and 307 and their respective clamping means, hovering over a worktable 905, on which the sockets 102, 202 and 302 have already been bolted in predetermined positions substantially corresponding to the relative positions of the attachment points 902 on the worktable, and thus of the balls 107, 207 and 307 attached thereto. Once the balls 107, 207 and 307 are aligned with the sockets 102, 202 and 302, the workpiece 901 can be lowered so that the balls 107, 207 and 307 come to rest within their respective sockets 102, 202 and 302, as seen in FIG. 12.

As the balls 107 and 207 enter their sockets 102 and 202, the rings 104 and 204 can move within the sockets 102 and 202 to adapt to any small variation in the relative positions of the attachment points 902 within their manufacturing tolerances.

The balls 107, 207 and 307 can then be clamped to fix their positions and orientations by tightly screwing the external members 113, 213 and 313 of their clamping means onto the sockets 102, 202 and 302. Because of the alignment of the rings 104 and 204 with their corresponding balls 107 and 207, the internal stresses in the workpiece 901 between the attachment points 902 are minimised.

Once each one of the external members 113, 213 and 313 is tightly screwed, the corresponding cover element 119, 219 or 319 can be pushed over the spring-loaded balls 120, 220, 320 to rest against each external member 113, 213, 313.

After at least one processing step, particularly after a machining step, new internal stresses may arise in the workpiece 901. When it is desired to release such new internal stresses, the external members 113, 213 and 313 can be loosened, so as to allow rotation of the balls 107, 207 and 307, as well as translation of ball 107 in any horizontal direction, and of ball 207 in the direction of the axis of the elongated guide 225. The balls 107, 207 and 307 can then be clamped again before the next processing step.

Although the present invention has been described with reference to specific exemplary embodiments, it will be evident that various modifications and changes may be made to these embodiments without departing from the broader scope of the invention as set forth in the claims. Accordingly, the description and drawings are to be regarded in an illustrative sense rather than a restrictive sense.

The invention claimed is:

1. A workpiece holding device comprising:
   a substantially spherical ball with means operable for releasably retaining a workpiece;
   a socket mountable on a worktable, the socket comprising an external screw thread;
   means for mounting the socket on the worktable;
   a ball-receiving element moveably mounted within the socket and being shaped to provide a first ball-receiving surface; and
   ball clamping means for releasably clamping the substantially spherical ball against the first ball-receiving surface with a ball clamping force, the ball clamping means comprising:—
      an external member for transmitting the ball clamping force to the socket, the external member comprising an internal screw thread; and
      an internal member including a second ball-receiving surface for contacting and for clamping the substantially spherical ball between the first and second ball-receiving surfaces;
   the workpiece holding device being characterized in the ball-receiving element is moveable along at least one axis within the socket in a plane substantially perpendicular to the ball clamping force;
   and in the external screw thread of the socket and the internal screw thread of the external member cooperate for connecting the external member and the socket and for generating the ball clamping force by tightening the connection between them.

2. The workpiece holding device according to claim 1, further comprising a cover element for protecting the workpiece holding device from falling debris.

3. The workpiece holding device according to claim 1, wherein the socket further comprises means for guiding the movement of the ball receiving element within the socket along a single axis substantially perpendicular to the ball clamping force.

4. The workpiece holding device according to claim 3, wherein the socket further comprises means for externally indicating the direction of the single axis.

5. The workpiece holding device according to claim 4, wherein the means for mounting the socket on the worktable comprise a plurality of bolts arranged around the socket and wherein at least one of these bolts is differently shaped and/or sized to indicate the direction of the single axis.

6. A workpiece holding system comprising a first workpiece holding device, a second workpiece holding device and a third workpiece holding device, wherein the first and second workpiece holding devices comprise workpiece holding devices according to claim 1, and wherein the third workpiece holding device comprises:
  a substantially spherical ball with means for releasably retaining a workpiece;
  a socket with a first ball-receiving surface and means for mounting the socket on a worktable; and
  means for releasably clamping the ball against the first ball-receiving surface, the first ball-receiving surface being fixed in a plane perpendicular to its ball clamping force.

7. A method of using a workpiece holding system according to claim 6, comprising the following steps:
  mounting the sockets of the first, second and third workpiece holding devices at predetermined positions on the worktable;
  attaching the balls of the first, second and third workpiece holding devices with their retaining means to different attachment points of the workpiece;
  placing the workpiece on the worktable in such a position that the balls come to rest against the first ball-receiving surfaces of the corresponding sockets; and
  clamping each ball against its corresponding first ball-receiving surface with the corresponding clamping means, so as to fix its position and orientation, and thus the position and orientation of the workpiece.

8. The method according to claim 7, further comprising the steps of:
  unclamping the balls of the three workpiece holding devices after carrying out at least one first processing step on the workpiece so as to release any new internal stresses in the workpiece caused by at least one first processing step; and
  clamping the balls again after substantially releasing the new internal stresses, so as to fix again the position and orientation of the workpiece before carrying out at least one further processing step on the workpiece.

9. The workpiece holding device according to claim 2, wherein the socket further comprises means for guiding the movement of the ball receiving element within the socket along a single axis substantially perpendicular to the ball clamping force.

10. A workpiece holding system comprising a first workpiece holding device, a second workpiece holding device and a third workpiece holding device, wherein the first and second workpiece holding devices comprise workpiece holding devices according to claim 2, and wherein the third workpiece holding device comprises:
  a substantially spherical ball with means for releasably retaining a workpiece;
  a socket with a first ball-receiving surface and means for mounting the socket on the worktable; and
  means for releasably clamping the ball against said first ball-receiving surface, wherein said first ball-receiving surface is fixed in a plane perpendicular to its ball clamping force.

11. The workpiece holding device according to claim 1, wherein said first ball-receiving surface comprises a substantially conical surface.

12. The workpiece holding device according to claim 1, wherein the second ball-receiving surface comprises a substantially conical surface.

* * * * *